3,250,680
HEAT-GENERATING COSMETIC COMPOSITION
John Menkart and Paul R. Ricciuti, Washington, D.C., assignors to The Gillette Company, Boston, Mass., a corporation of Delaware
No Drawing. Filed July 19, 1960, Ser. No. 43,715
7 Claims. (Cl. 167—85)

This invention relates to a cosmetic composition of the liquid, cream, gel or paste type which is adapted to evolve a sensible quantity of heat when it contacts moisture and pertains more specifically to a skin cream, hand cream, ointment, shampoo, toothpaste, cleansing cream or lotion, beauty mask, or the like, which develops an appreciable quantity of heat during use, either because of the application of water to the part of the body to which the cosmetic is applied or because of moisture naturally and inherently present on the body in the form of perspiration, etc., or because of the mixing of water with the composition either immediately before or during its use.

Such heat-producing cosmetic compositions produce a very pleasant sensation during their use, much more agreeable than the cold and clammy feeling frequently produced upon initial application of a cosmetic to the skin. In addition, in some cases, e.g., in the case of a hand cleaner or shampoo, the compositions of the present invention make possible the use of cold water instead of hot water for cleansing purposes without loss of effectiveness, the heat supplied by the composition itself sufficing to raise the temperature to that normally achieved by the use of hot water.

It has been found that compositions of the present invention may be provided by dispersing in a liquid vehicle a quantity of finely divided solid adsorbent materials capable of sorbing water exothermically. The liquid vehicle employed may be any non-aqueous liquid vehicle which is inert to, i.e., which is not sorbed by, the solid particulate adsorbent. The solid adsorbent materials which have been found to produce optimum results and which are therefore preferred include silica gel, activated alumina, and the synthetic zeolites (alkali metal alumino-silicates) which are characterized by having a crystal structure in the dry state containing voids of well-defined size which can be entered by molecules having less than a predetermined critical bulk. The preparation of such molecular sieves is described, for example, in U.S. Patents 2,882,243, and 2,882,244.

The particle size of the solid particulate adsorbent is not critical and will vary with the nature of the surface of the particles themselves (i.e., whether gritty or smooth surfaced) as well as with the physical form of the finished composition (i.e., whether a low viscosity liquid or a highly viscous cream or a gel). In general, however, the particles for best results should be no greater than 20 microns in diameter.

The liquid, creamy, or pasty vehicles for the solid adsorbent particles include any of the well-known cosmetically acceptable liquids or creams which are non-aqueous, which are inert to the adsorbent particles, and which are not sorbed by the particles, and which are either liquids at room temperature or are solids which can be liquefied by heating to a temperature not over 75° C. A wide variety of non-polar materials including all of the hydrocarbons which are cosmetically acceptable, particularly the saturated aliphatic hydrocarbons which are liquids at room temperature, may be employed as vehicles with any of the adsorbents. In the case of silica gel and the alkali metal alumino-silicates, it is possible to employ instead of the non-polar materials such polar water-miscible materials as the higher polyalkylene glycols containing at least three polyalkylene groups, each alkylene group having at least two carbon atoms so that the molecular weight is at least 150. Triethylene glycol and tripropylene glycol and higher polyethylene glycols and polypropylene glycols which melt at temperatures no higher than 75° C. are particularly preferred because the finished cosmetic compositions can be readily and smoothly diluted with water to produce the desired heat. Other liquid vehicles which can be employed include peanut oil, cetyl alcohol, isopropanol, and the like. Non-polar hydrocarbon waxes and high molecular weight solid polyalkylene glycols may be employed as thickeners in the composition of the present invention.

The relative proportions of solid adsorbent material and of vehicle may be varied over a wide range, from about 5% of adsorbent, based on the weight of the total composition, to as high as 40% by weight. For most purposes, however, it will be found that a minimum of 10% by weight of adsorbent is required to produce the desired amount of heat, while 35% by weight is the maximum quantity of adsorbent which can be conveniently admixed without in most cases producing an undesirably thick and viscous or unstable product.

Any of the other conventional ingredients employed in cosmetic compositions can be employed for their usual purpose and function in the compositions of the present invention. Among such ingredients are dyes, perfumes, surface active agents, fillers, abrasives, thickeners and waxes, including such materials as beeswax, lanolin, stearic acid, and the like. It is important, of course, that any such ingredients be anhydrous or nearly so.

In the following specific examples, there are given recipes for a variety of typical cosmetic compositions embodying the present invenion. It will be understood that numerous additional formulations may be prepared without departing from the spirit and scope of the present invention.

*Example 1.—Hand cleaner*

The following composition was prepared by mixing the monooleate with the monostearate at elevated temperature, then mixing in the triethylene glycol. After cooling, the silica filler and the solid adsorbent material were mixed in.

The recipe of the composition was as follows, in which the parts are by weight:

| | Parts |
|---|---|
| Polyoxyethylene sorbitan monooleate (Tween 80) | 7 |
| Sorbitan monostearate (Span 60) | 1 |
| Triethylene glycol | 90 |
| Silica filler (Cab-O-Sil M5) | 4 |
| Alkali metal alumino-silicate (molecular sieve 5A, the pores of which are inaccessible to molecules having a diameter greater than about 5 angstrom units) | 20 |

The finished composition was in the form of a cream or paste which was highly effective in cleaning grease and dirt from the hands when used in conjunction with cold tap water. A substantial heating effect occurred immediately upon mixing the composition with water. Best results were obtained by spreading the composition on the hands, then adding a small amount of water and mixing it with the composition in place on the hands, followed by rinsing.

*Example 2.—Cleansing cream*

A cleansing cream of the oil-in-water emulsion type was prepared having the following recipe, in which the parts are by weight:

| | Parts |
|---|---|
| Sorbitan monostearate (Span 60) | 5 |
| Polyoxyethylene sorbitan monostearate (Tween 60) | 2 |
| Beeswax | 10 |
| Anhydrous lanolin | 3 |
| Mineral oil | 20 |
| Peanut oil | 25 |
| Polyethylene glycol (molecular weight, 400) | 34 |
| Molecular sieve 5A | 33 |

In preparing the foregoing composition, the first four ingredients were melted and mixed together, after which the peanut oil and mineral oil were mixed in. The polyethylene glycol was added to the mixture with stirring at about 70° C., following which the mixture was cooled and the molecular sieve was stirred in gently.

This composition when spread on the moist skin developed a sensible quantity of heat which not only produced a pleasant sensation of warmth, but in addition had a tendency to enhance the cleaning effectiveness of the composition. It was readily removable from the skin by means of tissue in the usual manner, and it could also be removed by washing with water. In the latter case, some additional heat was developed, making it possible to employ cold water.

*Example 3.—Hand lotion*

A hand lotion of the oil-in-water emulsion type was prepared having the following recipe, in which the parts are by weight:

| | Parts |
|---|---|
| Cetyl alcohol | 1 |
| Anhydrous lanolin | 2 |
| Stearic acid | 6 |
| Triethylene glycol | 186 |
| Molecular sieve 5A | 78 |

The composition was prepared by melting and mixing the first three ingredients, after which the triethylene glycol was stirred in at about 70° C. The composition was cooled to room temperature, and the molecular sieve was stirred in. The lotion was found to produce a pleasant sensation of warmth when rubbed on the hands, apparently because of the small amount of moisture inherently present on the skin under normal conditions. The sensation of warmth could be enhanced by washing the hands in water immediately prior to application of the lotion so that additional moisture was present.

*Example 4.—Toothpaste*

The following toothpaste composition was prepared, in which the parts are by weight:

| | Parts |
|---|---|
| Dicalcium phosphate powder | 20 |
| Anhydrous aluminum oxide powder abrasive | 20 |
| Sodium lauryl sulfate | 2 |
| Triethylene glycol | 60 |
| Polyethylene glycol (molecular weight, 6000) | 3 |
| Molecular sieve 5A | 13 |

The first five ingredients were mixed with heating until the high molecular weight waxy polyethylene glycol was completely dissolved. After cooling, the molecular sieve particles were stirred in.

The toothpaste when used in the usual manner produced a remarkable sensation of warmth much different from the effect of conventional toothpaste.

*Example 5.—Beauty mask*

A beauty mask composition was prepared having the following recipe, in which the parts are by weight:

| | Parts |
|---|---|
| Polyvinylpyrrolidone thickener | 15 |
| Fuller's earth filler | 20 |
| Isopropanol | 80 |
| Silica filler (Cab-O-Sil M5) | 3 |
| Molecular sieve 5A | 40 |

The composition was prepared simply by mixing all of the ingredients together at room temperature. When applied to the skin of the face in the usual manner, it produced a gentle warmth which could be enhanced by washing the face with water immediately prior to use. The sensation of warmth persisted for some time, and the composition could be readily removed in the usual manner.

*Example 6.—All-purpose cream*

An all-purpose cream of the water-in-oil emulsion type was prepared having the following composition, in which the parts are by weight:

| | Parts |
|---|---|
| Beeswax | 10 |
| Anhydrous lanolin | 3 |
| Sorbitan monostearate (Span 60) | 1 |
| Mineral oil | 50 |
| Polyethylene glycol (molecular weight, 400) | 35 |
| Molecular sieve 5A | 50 |

The composition was prepared by melting and mixing the first three ingredients, after which the mineral oil, then the polyethylene glycol were stirred in at about 70° C. Upon cooling to room temperature, the molecular sieve was gently stirred in.

The finished all-purpose cream could be used in the usual manner, producing a gentle warming in the same manner as described above in connection with cleansing cream and hand lotion.

*Example 7.—Liquefying cleansing cream*

A liquefying cleansing cream was prepared having the following composition, in which the parts are by weight:

| | Parts |
|---|---|
| Petrolatum | 15 |
| Liquid paraffin | 20 |
| Mineral oil | 65 |
| Molecular sieve 5A | 30 |

The composition was prepared by melting and mixing the first three ingredients, after which the composition was cooled to approximately room temperature, and the molecular sieve was gently stirred in.

The composition could be employed in the same manner as conventional liquefying cleansing creams and was equally effective for the intended purpose, but produced in addition a remarkably satisfying sense of warmth.

*Example 8.—Ointment*

A simple ointment was prepared having the following composition, in which the parts are by weight:

| | Parts |
|---|---|
| Polyethylene glycol (molecular weight, 400) | 50 |
| Polyethylene glycol (molecular weight, 4000) | 50 |
| Molecular sieve 5A | 13 |

The composition was prepared by mixing the polyethylene glycols at a sufficiently high temperature to melt the high molecular weight material, after which the mixture was cooled to about room temperature and the solid adsorbent particles were stirred in. Any of the usual skin conditioning or treating materials, medicaments, etc., may be added to the ointment as desired. Upon application to the skin, it produces a gentle sensation of warmth which persists for some time.

Example 9.—Cream shampoo

A cream shampoo composition was prepared having the following recipe, in which the parts are by weight:

| | Parts |
|---|---|
| Sodium lauryl sulfate | 25 |
| Triethylene glycol | 75 |
| Polyethylene glycol (molecular weight, 6000) | 3 |
| Molecular sieve 5A | 54 |

The composition was prepared by mixing the first three ingredients at a temperature high enough to melt the high molecular weight polyethylene glycol, after which the mixture was cooled to about room temperature and the solid adsorbent particles were stirred in.

This cream shampoo could be employed in the usual manner by first wetting the hair then rubbing in the shampoo composition. It was found that effective cleaning could be attained even when using cold water.

Example 10.—Ointment

A skin ointment was prepared having the following composition, in which the parts are by weight:

| | Parts |
|---|---|
| Polyethylene glycol (molecular weight, 400) | 50 |
| Polyethylene glycol (molecular weight, 4000) | 5 |
| Silica gel (average particle size, 1 micron) | 23 |

The composition was prepared in the same manner as the composition of Example 8. There could be incorporated any of the usual skin-treating ingredients or medicaments as are employed in conventional ointments. The same warmth was produced by the ointment when applied to the skin as was produced in the case of Example 8.

Example 11.—Liquefying cleansing cream

A liquefying cleansing cream was prepared having the same composition as that of Example 7, except that there was substituted for the molecular sieve 5A 30 parts by weight of activated alumina (average particle size, about 10 microns). The finished composition resembled that of Example 7 very closely and could be used in the same manner.

Although the foregoing specific examples represent typical recipes for a variety of cosmetic compositions, it will be understood that the identity and relative quantities of the several ingredients may be varied in accordance with conventional practice. The silica gel particles, of course, may be substituted for the alkali metal alumino-silicate particles in all of the foregoing recipes with equally good results. The activated alumina particles, however, can be employed only in conjunction with non-polar liquid vehicles.

Although specific embodiments of the invention have been described herein, it is not intended to limit the invention solely thereto, but to include all of the obvious variations and modifications within the spirit and scope of the appended claims.

What is claimed is:

1. An anhydrous composition which evolves heat upon contact with moisture consisting of cosmetic material, an anhydrous solid particulate adsorbent material capable of sorbing water exothermically selected from the class consisting of silica gel, activated alumina, and alkali metal alumino-silicate molecular sieves dispersed in a non-aqueous non-toxic cosmetically acceptable vehicle which is inert to said adsorbent, said adsorbent material amounting to 5% to 40% by weight of the total composition.

2. A cosmetic composition as defined in claim in which said vehicle consists essentially of a non-polar organic vehicle.

3. A cosmetic composition as defined in claim 1 in which the maximum diameter of the particles of adsorbent material is twenty microns.

4. A cosmetic composition as defined in claim 1 in which said adsorbent is activated alumina particles having a maximum particle diameter of twenty microns and said vehicle is in a non-polar organic liquid vehicle which is inert to said particles.

5. A cosmetic composition as defined in claim 2 in which said vehicle comprises mineral oil.

6. A cosmetic composition as defined in claim 1 in which said adsorbent is silical gel particles having a maximum particle diameter of twenty microns and said vehicle is a liquid polyalkylene glycol having a molecular weight of at least 150 which is inert to said particles.

7. A cosmetic composition as defined in claim 1 in which said adsorbent is alumino-silicate molecular sieve particles having a maximum particle diameter of twenty microns and said vehicle is a liquid polyalkylene glycol having a molecular weight of at least 150 which is inert to said particles.

References Cited by the Examiner
UNITED STATES PATENTS

| | | | |
|---|---|---|---|
| 2,194,218 | 11/1940 | Dickenson | 167—72 |
| 2,830,010 | 4/1958 | Valentine | 167—83 |
| 2,857,311 | 10/1958 | Thurmon | 167—92 |
| 2,882,243 | 4/1959 | Milton | 23—113 |
| 2,882,244 | 4/1959 | Milton | 252—455 |

OTHER REFERENCES

Chem. Abs., ACS, vol. 46, 1952, p. 7866cd, vol. 50, 1956, p. 14339j.

Goodman, 100 Dermatologic Formulas, Medical Lay Press, 1949, pp. 8–11.

Goodman, Cosmetic Dermatology, McGraw-Hill Book Co., New York, 1936, pp. 270–271.

Iler, The Colloid Chem. of Silica and Silicates, Cornell U. Press, Ithaca, N.Y., 1955, pp. 149–50, 172, 186–187, 191–198, 240–241.

Linde, Chemical Loaded Molecular Sieves, bulletin, Linde Co., Div. of Union Carbide Corp., New York, July 1, 1959, pp. 1, 2, 4.

Proul, JAPhA, Sci. Ed., 1940, pp. 372–374.

Sagarin Cosmetics, Sci. and Tech., Intersci. Pub., 1957, pp. 162–164, New York.

Santocel, Monsanto Chem. Co., Inorganic Chem. Div., St. Louis, Mo., 1956, page 3.

JULIAN S. LEVITT, *Primary Examiner.*

MORRIS O. WOLK, LEWIS GOTTS, *Examiners.*